United States Patent
Vogel et al.

(10) Patent No.: US 9,771,682 B2
(45) Date of Patent: Sep. 26, 2017

(54) ADJUSTMENT ASSEMBLY FOR AXIALLY ADJUSTING A ROTOR IN A ROTARY FEEDER

(71) Applicant: Andritz Inc., Glens Falls, NY (US)

(72) Inventors: Keith Vogel, Queensbury, NY (US); Thomas Sullivan, Argyle, NY (US)

(73) Assignee: Andritz Inc., Glens Falls, NY (US)

( * ) Notice: Subject to any disclaimer, the term of this patent is extended or adjusted under 35 U.S.C. 154(b) by 0 days.

(21) Appl. No.: 15/346,846

(22) Filed: Nov. 9, 2016

(65) Prior Publication Data

US 2017/0067205 A1 Mar. 9, 2017

Related U.S. Application Data

(63) Continuation of application No. 14/690,505, filed on Apr. 20, 2015, now Pat. No. 9,523,462.

(60) Provisional application No. 61/993,513, filed on May 15, 2014.

(51) Int. Cl.
| | | |
|---|---|---|
| *B65G 53/00* | (2006.01) | |
| *D21C 7/06* | (2006.01) | |
| *F16M 1/00* | (2006.01) | |
| *B65G 53/46* | (2006.01) | |

(52) U.S. Cl.
CPC .......... *D21C 7/06* (2013.01); *B65G 53/4625* (2013.01); *F16M 1/00* (2013.01)

(58) Field of Classification Search
CPC ......... B65G 53/4625; D21C 7/06; F16M 1/04
USPC .................................................... 406/52, 63
See application file for complete search history.

(56) References Cited

U.S. PATENT DOCUMENTS

| | | | | |
|---|---|---|---|---|
| 3,709,333 A | * | 1/1973 | Buyze | F16D 65/567 188/196 BA |
| 4,372,338 A | | 2/1983 | Efferson | |
| 4,709,634 A | * | 12/1987 | Momot | B41F 13/14 101/181 |
| 5,086,885 A | * | 2/1992 | Bowsher | F16D 65/18 188/196 D |
| 5,443,162 A | | 8/1995 | Sherman | |
| 5,597,446 A | | 1/1997 | Sato et al. | |

(Continued)

FOREIGN PATENT DOCUMENTS

| | | |
|---|---|---|
| DE | 721850 | 6/1942 |
| EP | 0732280 | 9/1996 |

(Continued)

OTHER PUBLICATIONS

The Bauer Bros. Co. and Bauer International, Product Brochure, 1969, p. 9, The Bauer Bros. Co. and Bauer International, Springfield OH, USA.

*Primary Examiner* — Joseph Dillon, Jr.
(74) *Attorney, Agent, or Firm* — Kerri Hochgesang; Robert Joseph Hornung

(57) ABSTRACT

A mounting and support mechanism for a rotary feeder gear motor having an adjusting housing, wherein the adjusting housing includes a support flange adjacent the gear motor, a hollow adjusting housing and a support flange adjacent a stationary feeder end cover. Contained within the adjusting housing is a carrier extension wherein the carrier extension at one end encases a stationary bushing, the stationary bushing houses an adjusting shaft to provide movement of a rotor assembly axially, and at the opposite end the carrier extension connects to a bearing carrier mechanism.

20 Claims, 4 Drawing Sheets

(56) References Cited

U.S. PATENT DOCUMENTS

| | | | |
|---|---|---|---|
| 5,622,598 A | 4/1997 | Prough | |
| 5,913,458 A | 6/1999 | Eriksson | |
| 6,511,007 B1* | 1/2003 | Matsuura | A01K 89/033 |
| | | | 242/290 |
| 6,669,410 B2 | 12/2003 | Prough | |
| 7,350,674 B2 | 4/2008 | Hoglund | |
| 8,276,744 B2* | 10/2012 | Bacalia | F16H 19/025 |
| | | | 198/617 |
| 8,377,261 B2* | 2/2013 | Bengtsson | D21C 7/06 |
| | | | 162/237 |
| 2008/0290247 A1* | 11/2008 | Ussery | F16D 3/68 |
| | | | 248/678 |
| 2009/0050088 A1* | 2/2009 | Schafer | F01L 1/352 |
| | | | 123/90.17 |
| 2009/0142147 A1 | 6/2009 | Pope | |
| 2009/0224195 A1* | 9/2009 | Lackey | D21C 7/06 |
| | | | 251/304 |
| 2016/0032963 A1* | 2/2016 | Tsutsumi | F16C 23/04 |
| | | | 384/251 |
| 2016/0311668 A1* | 10/2016 | Huang | B66D 1/12 |

FOREIGN PATENT DOCUMENTS

| | | |
|---|---|---|
| GB | 503710 | 4/1939 |
| SE | 503684 | 7/1996 |

* cited by examiner

ADJUSTMENT ASSEMBLY FOR AXIALLY ADJUSTING A ROTOR IN A ROTARY FEEDER

CROSS-RELATED APPLICATION

This application is a continuation application claiming the benefits of U.S. application Ser. No. 14/690,505 filed Apr. 20, 2015, which is a non-provisional application claiming priority to U.S. Provisional Patent Application No. 61/993,513 filed May 15, 2014, the entirety of which is incorporated herein by reference.

BACKGROUND OF THE INVENTION

This disclosure relates to a method and system for feeding comminuted cellulosic fibrous material ("chips") to a treatment vessel, such as a continuous digester, which may produce cellulosic pulp. This disclosure particularly relates to the mounting and support mechanism for adjusting and monitoring a rotary feeder.

Rotary feeders, for example high-pressure feeders (HPFs) and low-pressure feeders (LPFs), asthma feeders, and other similar devices, transfer chips from a chip supply system to a chip processing system, such as a continuous digester system for chemical pulping of wood chips or other cellulosic material. HPFs are described in U.S. Pat. No. 6,669,410 and transfer chips from a low-pressure chip supply system to a high-pressure chip supply system. Other rotary feeders such as LPFs transfer chips from atmospheric (or near atmospheric) pressure to a low-pressure chip supply system (such as 15 psig to 35 psig).

LPFs and HPFs are components of a continuous digester system. They provide the ability to change (increase) the pressure of the slurry of wood chips and liquor to be fed to the digester vessel. Without the high-pressure chip slurry provided by one or each of either of the LPF and HPF, the digester system is disabled. Other rotary feeders may also be used in other locations within a pulp mill to impact a change in pressure of the slurry material entering the rotary feeders versus the pressure of the slurry of material leaving the rotary feeders. When a rotary feeder is shut-down for repair or maintenance, the digesting process and the resultant production of pulp ceases until the rotary feeder is restarted.

Rotary feeders are conventionally mechanical rotary valve devices adjusted with manual or motor driven controls. A common control adjustment is to adjust the clearance between a rotating pocket rotor and a cylindrical chamber of the housing for a rotary feeder. The clearance is usually a gap between an outer cylindrical surface of the rotor and an inner cylindrical surface of the chamber. This clearance (gap) typically allows a small amount of liquid to serve as a lubricant between the pocket rotor and chamber. In this document, the terms "clearance" and "gap" are used taken to mean the same.

If the clearance is too wide, a pressure loss can occur in the rotary feeder fluid flowing through the rotary feeder, excessive liquid and cellulosic material may flow through the clearance (gap) and accumulate in the housing, e.g., in the end bells of the housing, and excessive liquid may leak through to a low-pressure outlet of the rotary feeder. If the clearance is too narrow, metal to metal contact may occur between the rotor and chamber and debris caught in the clearance (gap) may etch grooves in the rotor or chamber. Accordingly, the clearance between the pocket rotor and chamber should generally be maintained in an acceptable range. Support to prevent torsion and axial forces acting on the rotary feeder due to normal operation should generally be provided.

The clearance between the pocket rotor and chamber of the housing can be adjusted by moving the rotor axially with respect to the housing. The pocket rotor and chamber each are generally slightly tapered. Because of the taper, the clearance between the rotor and housing can be adjusted by axial movement of the rotor. Examples of a manual and motor driven controls are disclosed in EP 0732280-A1, a Bauer Rotary Valve Brochure published in 1969, Swedish Patent C503684, Great Britain Patent GB 503 710, German Patent DE 721 850, U.S. Pat. No. 4,372,338 and U.S. Pat. No. 7,350,674.

As described in these disclosures, axial movement of the rotor could be by manually turning a wheel at the end of a rotary feeder, or based on automatic computer control of a motor to impart axial movement of the rotor. In each of these disclosures the support mechanisms for the adjustment of the pocket rotor are located on the outside of the housing. Operator safety and adjustment mechanism accuracy concerns arise when the support mechanisms are located outside the housing.

Operation personnel or others in close proximity to the rotor housing could be injured when the axially moving gearbox is operated without warning. This situation creates a pinch point where persons could become injured. Another disadvantage of the support and control mechanisms being on the outside of the rotary housing is the accuracy of the adjustments made.

Because the gearbox for the adjusting mechanism slides on bolt heads, a less than precise adjustment is made. As the sliding area is exposed to the outside environment, dirt, grime, and elements of the weather can be deposited on the sliding area resulting in obstructions on the metal surface of sliding area. The obstructions on the metal surface can inhibit the smooth movement of the gearbox on the sliding area and increase the opportunity for personnel injury when trying to clean or remove obstructions. In addition, exposure to the environment increases the wear of the metal to metal surfaces of the support and control mechanism of prior art systems.

An example of a suitable automatic computer control method for the prior art systems currently in use can be found in US 2009-0142147 (incorporated here by reference).

Maintaining an optimal clearance between the pocket rotor and chamber of the housing can be helpful to extend the operational life of the rotary feeder, particularly the pocket rotor and surface of the chamber. Additionally, it is important to maintain an optimal clearance between the pocket rotor and chamber of the housing to avoid damage to the rotor and chamber, to minimize the power load of the rotary feeder, and to minimize the fluid pressure loss due to fluid leakage through the clearance between the pocket rotor and the chamber of the housing. There is a long felt need is to provide an effective and simple support mechanism (structural support) for the rotary feeder adjustment mechanism including the power source for the adjustment mechanism. Additionally, there is a long felt need to protect the adjustment mechanism of the rotary feeder from exposure to the environmental elements existing in the location of the rotary feeder.

BRIEF SUMMARY OF THE INVENTION

A rotary feeder having the ability to allow for pressure changes typically requires an adjusting mechanism having a motor, an adjusting shaft, a stationary bushing, and a bearing carrier mechanism. A mounting and support mechanism for the rotary feeder adjusting mechanism having a gear motor, adjusting shaft, stationary bushing, and bearing carrier mechanism has been developed to provide the necessary torsional and axial support while locating the mounting and support mechanism within the housing of the rotary feeder.

The mounting and support mechanism includes a hollow adjusting housing, which is typically stationary, made up of a support flange attached to the rotary feeder gear motor body end where the adjusting shaft can move toward a bearing carrier mechanism, a flange adjacent a rotary feeder stationary feeder end cover, and a hollow adjusting housing extending between the support flange and the flange adjacent the rotary feeder stationary feeder end cover. Contained within the hollow adjusting housing is a carrier extension wherein the carrier extension at one end encases a stationary bushing, the stationary bushing houses an adjusting shaft to provide movement of a rotor assembly axially, and at the opposite end the carrier extension connects to a bearing carrier mechanism.

By locating the mounting and support mechanism inside the hollow adjusting housing personnel proximate to the rotary feeder are protected from injuries caused by the sudden and often unannounced movement of the adjusting shaft. Additionally, reduced wear of the metal surface of previously exposed mechanisms is realized. Also, less damage from the environment due to exposure of the adjusting shaft to the environment (dirt, grime, water, weather, etc.) is realized. The accuracy of the adjustment made is improved as the mounting and support mechanism is internal to the hollow adjusting housing and protected from the environment.

DETAILED DESCRIPTION OF THE INVENTION

The following detailed description of the exemplary embodiments is presented only for illustrative and descriptive purposes and is not intended to be exhaustive or to limit the scope and spirit of the invention. The embodiments were selected and described to best explain the principles of the invention and its practical application. A person of ordinary skill in the art will recognize many variations can be made to the invention disclosed in this specification without departing from the scope and spirit of the invention.

A rotary feeder typically has the ability to adjust the rotor axially to allow for proper operation of the rotary feeder. Adjusting the rotor axially allows for fluid control and control of the clearance (gap) between the rotary feeder pocket rotor and a housing chamber of the rotary feeder, thereby allowing for pressure changes to be accomplished as the slurry of material flows through the rotary feeder. To control parameters, a rotary feeder adjusting mechanism is needed. The adjusting mechanism includes a rotary feeder gear motor, an adjusting shaft, a stationary bushing, and a bearing carrier mechanism.

Figure 1:
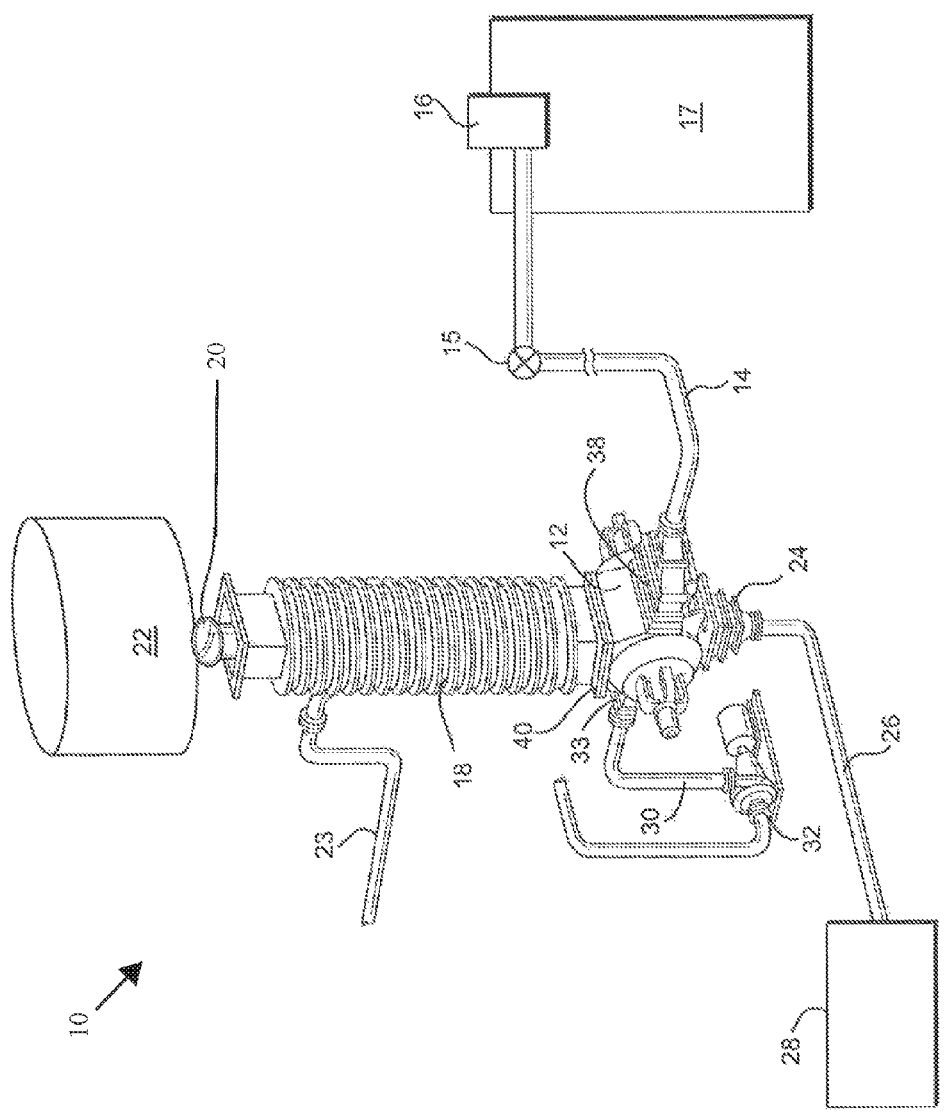
FIG. 1 is a schematic diagram of a conventional chip feed system for feeding a slurry of comminuted cellulosic fibrous material to a continuous digester or other high-pressure vessel.

FIG. 1 is a schematic diagram of a conventional feed system 10 for providing a slurry of comminuted cellulosic material, e.g., wood chips, to a rotary feeder known as a high-pressure feeder (HPF) 12 and to a high-pressure outlet port 38 and to a high-pressure output conduit 14 leading to an inlet 16, e.g., a top separator, of a continuous digester vessel 17. The HPF 12 receives a low-pressure slurry or low-level feed, via a chip chute 18, of comminuted cellulosic fibrous material ("chip slurry") and outputs a high-pressure chip slurry via high-pressure output conduit 14. The high-pressure slurry is suitable for introduction into a continuous digester, chip steaming vessel and other high-pressure chip processing systems. A flow meter 15 may measure the rate of slurry flow through the high-pressure output conduit 14 and to the inlet 16 of the continuous digester vessel 17.

The low-pressure slurry is fed to the chip chute 18 through a chip flow meter 20 from a chip bin 22 or other chip supply system, such as shown in U.S. Pat. No. 5,622,598. Additional liquor may be added to the chip flow in the chip chute 18 through conduit 23. The slurry of comminuted cellulosic material from the chip chute 18, enters the HPF 12 through a low-pressure inlet port 40.

The HPF 12 has a low-pressure outlet port 24 for liquor which flows through the HPF 12 but does not exit to the high-pressure stream in high-pressure output conduit 14. The liquor from the low-pressure outlet port 24 flows through conduit 26 to a liquor recovery system 28 that may circulate the liquor to, for example, the low-pressure side of the chip feed system. Liquor from the low-pressure outlet port 24 after flowing through conduit 26 may be returned to the HPF 12. If liquor from the low-pressure outlet port 24 is returned to the HPF 12, the liquor from the low-pressure outlet port 24 is pressurized by a high-pressure hydraulic pump 32 and flows at high-pressure through conduit 30 to the high-pressure inlet port 33 of the HPF 12. The high-pressure liquor in the HPF 12 pressurizes the chip slurry from the chip chute 18 such that the chip slurry exits the HPF 12 at high-pressure into high-pressure output conduit 14.

Figure 2:
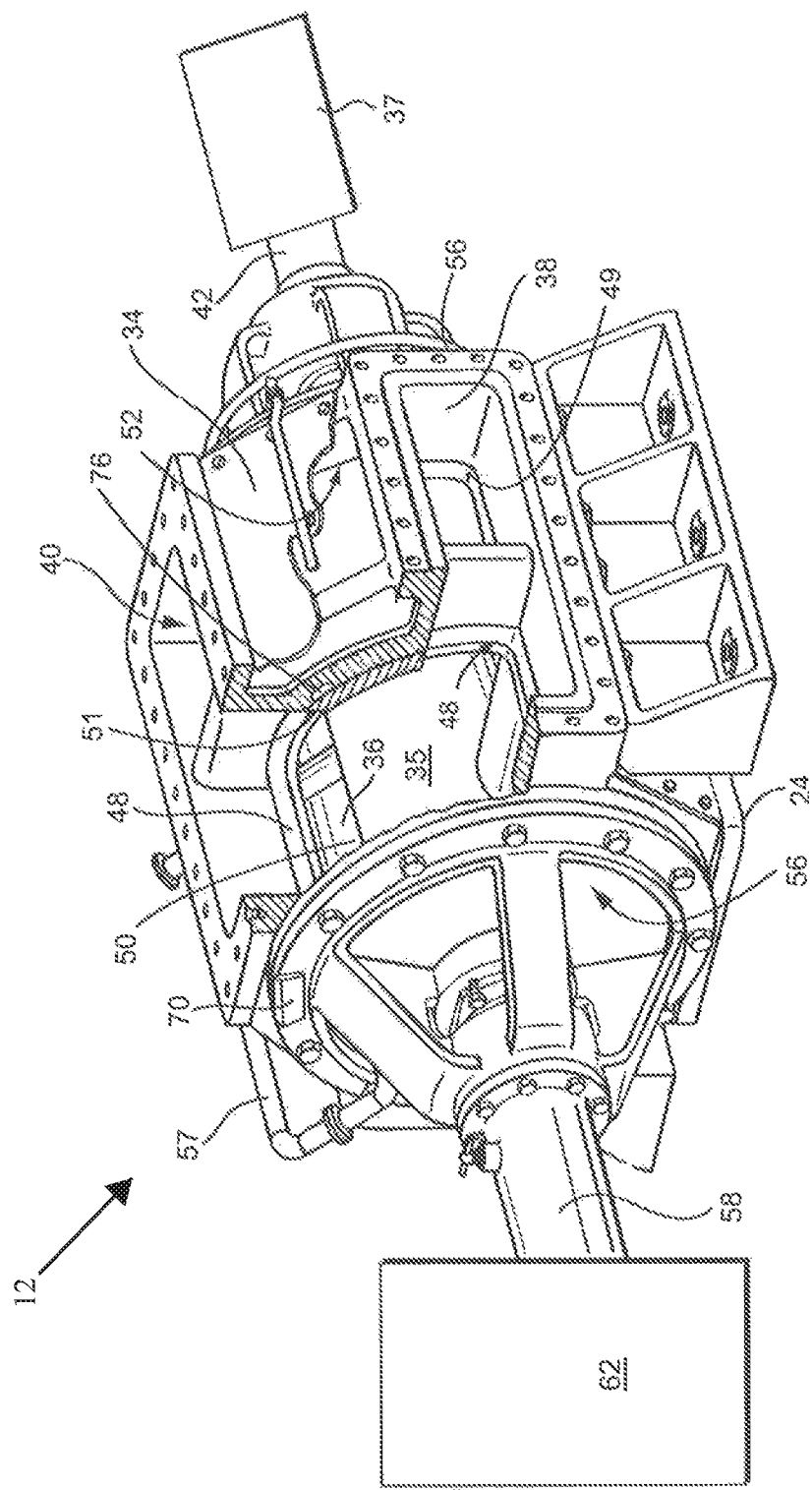
FIG. 2 is a perspective view of a conventional high-pressure feeder having a remotely controllable rotor clearance adjustment mechanism and shows a cut-away view of the interior of the housing for the feeder and a pocket rotor in the housing.

FIG. 2 shows a high-pressure feeder (HPF) 12 comprising a stationary housing 34 with a pocketed cylindrical rotor 35 mounted for rotation in a tapered cylindrical housing chamber 48 of the stationary housing 34. The stationary housing 34 includes four ports: a high-pressure inlet port 33 (in rear of stationary housing 34 and shown in FIG. 1); a high-pressure outlet port 38; a low-pressure inlet port 40 and a low-pressure outlet port 24 (in bottom of housing and shown in FIG. 1). The low-pressure inlet port 40 is located on the stationary housing 34 opposite from the low-pressure outlet port 24. The high-pressure inlet port 33 is located on the stationary housing 34 opposite from the high-pressure outlet port 38.

The pocketed cylindrical rotor 35 is rotated by a variable speed motor and gear reducer 37 coupled to a drive shaft 42. The pocketed cylindrical rotor 35 is driven to rotate in the tapered cylindrical housing chamber 48, such that the through-going pockets 36 of the pocketed cylindrical rotor 35 sequentially communicate with the four ports of the stationary housing 34.

Also shown in FIG. 2, is a controller and motor assembly 62 and a shaft 58 that is coupled to and adjusts the axial position of the pocketed cylindrical rotor 35. While the controller, gear motor and gear box may be separate, they are depicted in FIG. 2 as the controller and motor assembly 62. The controller housing has an end that couples to an end bell chamber 56 of the HPF 12. The controller and motor assembly 62 supports an actuator for axially moving the shaft 58 and pocketed cylindrical rotor 35. The actuator includes a gear motor and gearbox that controls the axial position of the shaft 58 and hence the axial position of the pocketed cylindrical rotor 35. The gearbox engages spiral threads on the shaft 58 to rotate the shaft 58. The rotation of the shaft 58 by the gearbox causes axial movement of the shaft 58 and pocketed cylindrical rotor 35.

Figure 3:
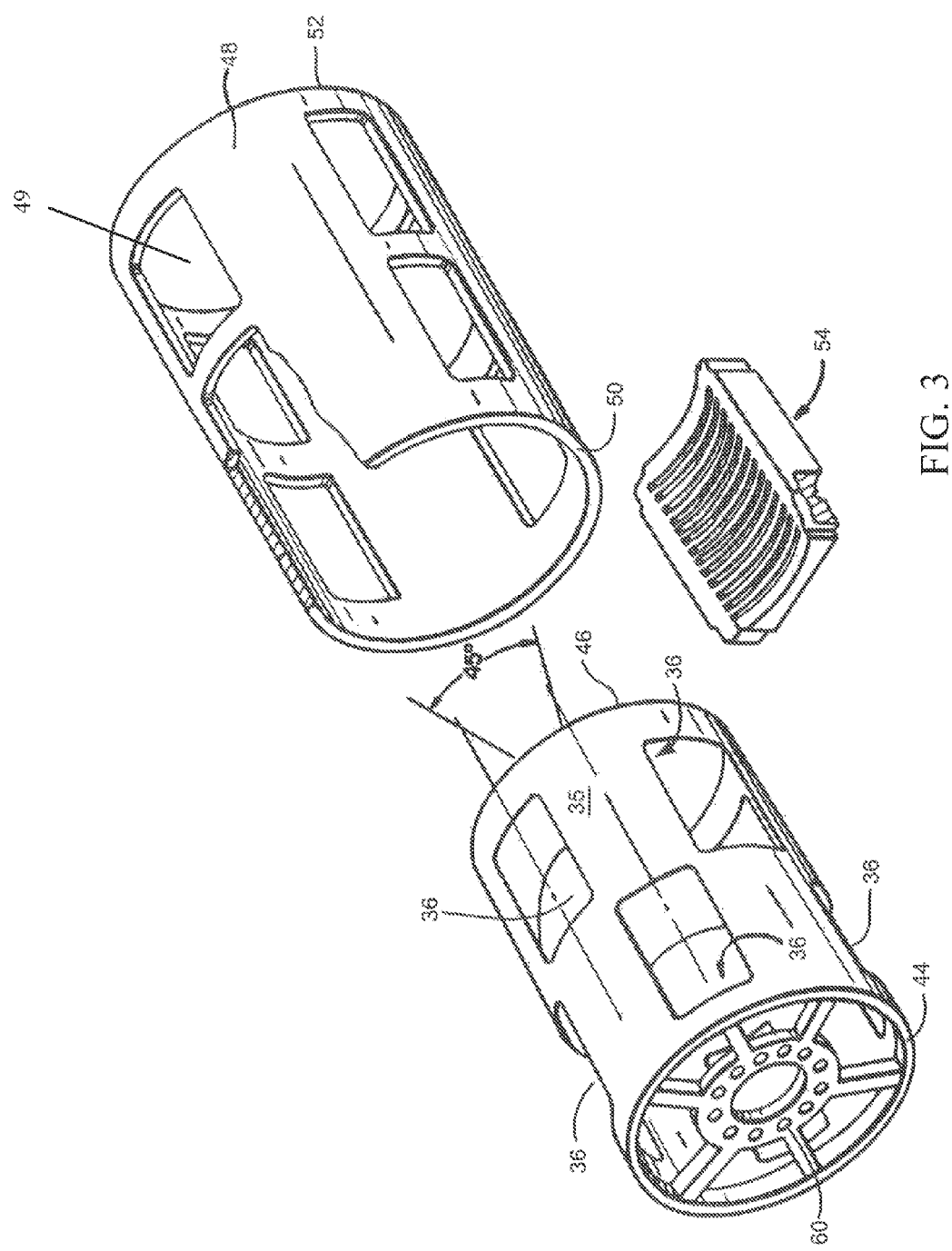
FIG. 3 is an exploded view of a conventional pocket rotor, cylindrical chamber of the feeder housing and a screen plate.

As shown in FIG. 3, the pocketed cylindrical rotor 35 contains two or more through-going pockets 36 such that different pockets communicate with different high and low-pressure ports as the rotor rotates. Each pocket in the rotor defines a passage through the rotor with openings on opposite sides of the passage. The pocketed cylindrical rotor 35 typically rotates at a speed of between about 5 to 15 revolutions per minute (rpm), preferably, between about 7 to 10 rpm, depending upon the capacity of the HPF 12 and the production rate of the pulping system it is used to feed.

The low-pressure outlet port of the HPF 12 is typically provided with a screen element 54, for example, a cast horizontal bar type screen element such as the screen element 29 in U.S. Pat. No. 5,443,162. The screen element 54 retains the chips in the slurry within the HPF 12 and allows some of the liquid in the slurry to pass out of the second end of the pocket, through the screen and out through the low-pressure outlet port 24.

Chips flow into a through-going pocket(s) 36 of the pocketed cylindrical rotor 35 when the openings of the through-going pocket 36 align with the low-pressure inlet port 40 and low-pressure outlet port 24 of the HPF 12, e.g., the pocket is vertical. The chips flow into the through-going pocket(s) 36 from the chip chute 18 and mix with any remaining chips retained in the through-going pocket 36 by the screen element 54. The screen element 54 prevents chips from flowing through the through-going pocket 36 and out the low-pressure outlet port 24.

As the through-going pocket 36 rotates 90 degrees, e.g., a quarter turn, the chips in the through-going pocket 36 are transported from a low-pressure flow to a high-pressure flow as the openings in the through-going pocket 36 align with the high-pressure inlet port 33 and high-pressure outlet port 38 of the HPF 12. After this one-quarter revolution of the pocketed cylindrical rotor 35, the first end of the through-going pocket 36 that was once in communication with the low-pressure inlet port 40 is placed in communication with the high-pressure outlet port 38. The high-pressure outlet port 38 typically communicates with the inlet of a continuous digester vessel 17, either a continuous or batch digester, via one or more conduits. At the same time, this quarter-turn rotation of the pocketed cylindrical rotor 35 also places the second end of the through-going pocket 36, which was just in communication with the low-pressure outlet port 24, in communication with the high-pressure inlet port 33.

The high-pressure inlet port 33 typically receives a flow of high-pressure liquid from a high-pressure hydraulic pump 32. The pressure of this high-pressure liquid from a high-pressure hydraulic pump 32 typically ranges from about 5 to 15 bar gauge, and is typically about 7 to 10 bar gauge. This high-pressure liquid displaces the slurry of chips and liquid from the through-going pocket 36 and out of the high-pressure outlet port 38 and ultimately to the inlet of the continuous digester vessel 17.

As the pocketed cylindrical rotor 35 continues to rotate, the second end of the through-going pocket 36 which received the high-pressure fluid is placed in communication with the low-pressure inlet port 40 and receives another supply of slurry from the conduit connected to the low-pressure inlet port 40. Similarly, the first end of the through-going pocket 36 is rotated into communication with the low-pressure outlet port 24 of the stationary housing 34, having the screen element 54.

The process described above repeats such that during one complete revolution of the pocketed cylindrical rotor 35 each through-going pocket 36 receives and discharges two charges of chips and liquid. The pocketed cylindrical rotor 35 typically contains at least two, typically four, through-going pockets 36 such that the pocketed cylindrical rotor 35 is repeatedly receiving slurry from the low-pressure inlet port 40 and discharging slurry out the high-pressure outlet port 38. The ends of these through-going pockets 36 act as each of either an inlet for slurry and an outlet depending upon the orientation of the pocketed cylindrical rotor 35.

FIG. 3 shows the pocketed cylindrical rotor 35 having a cylindrical shape with a slight taper extending from the first end 44 of the pocketed cylindrical rotor 35 to the second end 46 opposite the first end 44 of the pocketed cylindrical rotor 35. The first end 44 of the pocketed cylindrical rotor 35 may a smaller diameter than the second end 46 of the pocketed cylindrical rotor 35. The pocketed cylindrical rotor 35 fits in a tapered cylindrical housing chamber 48 (FIG. 2) fixed to the stationary housing 34. The tapered cylindrical housing chamber 48 has a taper similar to the taper of the pocketed cylindrical rotor 35. A housing first end 50 of the tapered cylindrical housing chamber 48 has a smaller diameter than a housing second end 52 located opposite the housing first end 50 of the tapered cylindrical housing chamber 48.

The tapered cylindrical housing chamber 48 has openings 49 (FIG. 2) that are aligned with the inlets and outlets of the stationary housing 34 (FIG. 2) of the HPF 12 (FIG. 2). The chip slurry flows through openings 49 (FIG. 2) in the tapered cylindrical housing chamber 48 to enter the through-going pockets 36 of the pocketed cylindrical rotor 35 and exit the pocketed cylindrical rotor 35 through openings 49 (FIG. 2) in the tapered cylindrical chamber 48 to the high-pressure outlet port 38 (FIG. 2) of the HPF 12 (FIG. 2). Similar, high-pressure liquid passes through the openings 49 (FIG. 2) in the tapered cylindrical chamber 48 to enter the through-going pockets 36 of the pocketed cylindrical rotor 35 and discharge through openings 49 (FIG. 2) in the tapered cylindrical housing chamber 48 to exit through the low-pressure outlet port 24 (FIG. 2) of the HPF 12 (FIG. 2).

An annular gap 51 (FIG. 2) is formed between the pocketed cylindrical rotor 35 and the tapered cylindrical housing chamber 48, when the pocketed cylindrical rotor 35 is inserted into the tapered cylindrical housing chamber 48. The annular gap 51 may be small and tapered and may allow the pocketed cylindrical rotor 35 to rotate within the tapered cylindrical housing chamber 48. The width of the annular gap 51 (FIG. 2) is determined by the axial position of the pocketed cylindrical rotor 35 with respect to the tapered cylindrical housing chamber 48.

Due to the complementary conical shapes of the pocketed cylindrical rotor 35 and tapered cylindrical housing chamber 48, the annular gap 51 (FIG. 2) may be narrowed by moving the pocketed cylindrical rotor 35 axially towards the small diameter end of the tapered cylindrical housing chamber 48. Similarly, the annular gap 51 (FIG. 2) may be expanded by moving the pocketed cylindrical rotor 35 axially towards the large diameter end of the tapered cylindrical housing chamber 48. During its axial movement, the pocketed cylindrical rotor 35 remains within the tapered cylindrical housing chamber 48.

The width of the annular gap 51 (FIG. 2) may be changed by automatically or manually adjusting the axial position of the pocketed cylindrical rotor 35 within tapered cylindrical housing chamber 48. The high-pressure feeder 12 (FIG. 2) disclosed herein includes a motor driven shaft 58 that is coupled to an end of the pocketed cylindrical rotor 35. The shaft 58 (FIG. 2) is axially aligned with the pocketed cylindrical rotor 35.

A small amount of liquid flows through the annular gap 51, such as from outlets in the pocketed cylindrical rotor 35. This liquid serves as a lubricant between the pocketed cylindrical rotor 35 and the tapered cylindrical housing chamber 48. The liquid drains through the screen element 54 below the tapered cylindrical housing chamber 48 and adjacent the low-pressure outlet port 24 of the stationary housing 34. The liquid from the low-pressure outlet port 24 may be reused in, for example, the conventional feed system 10.

In addition, liquid may collect in end bell chambers 56 (FIG. 2) of the stationary housing 34 (FIG. 2) that are adjacent opposite ends of the pocketed cylindrical rotor 35 and tapered cylindrical housing chamber 48. The liquid in the end bell chambers 56 (FIG. 2) is preferably maintained under pressure to prevent additional flow, which may include fines, into the end bell chambers 56.

A conduit 57 (FIG. 2), for the addition of liquid such as white liquor or other suitable liquid, is connected to an inlet port to each of the end bell chambers 56 at opposite ends of the stationary housing 34 (FIG. 2) for the HPF 12 (FIG. 2). The liquid is provided under pressure from the conduit 57 (FIG. 2) to pressurize the liquid in the end bell chambers 56 (FIG. 2) and to prevent a flow of liquor and fines from the pocketed cylindrical rotor 35 into the end bell chambers 56 (FIG. 2).

If the annular gap 51 (FIG. 2) is too large, excessive liquid and small particles (such as fiber fines, sand and other small debris, especially metal, rock and sand) may be present in the annular gap 51. The presence of excess liquid and small particles in the annular gap 51 may cause grooves to form in the outer surface of the pocketed cylindrical rotor 35 and in the inner surface of the tapered cylindrical housing chamber 48. Grooves in the outer surface of the pocketed cylindrical rotor 35 and in the inner surface of the tapered cylindrical housing chamber 48 may cause adverse operations of the HPF 12 and eventually cause the HPF 12 to be shut down.

Additionally, if the annular gap 51 (FIG. 2) between the pocketed cylindrical rotor 35 and the tapered cylindrical housing chamber 48 is too large, excess liquid and small particles may enter the annular gap 51 (FIG. 2) through openings in the through-going pockets 36 in the pocketed cylindrical rotor 35. The small particles (for example fines and debris) may flow through the annular gap 51 (FIG. 2) and collect in interior end bell chambers 56 (FIG. 2) adjacent the axial ends of the pocketed cylindrical rotor 35. If excessive amounts of small particles (fines and debris) collect in the end bell chambers 56 (FIG. 2), the small particles may resist the rotation of the pocketed cylindrical rotor 35, causing the pocketed cylindrical rotor 35 components to wear and increase the power consumption of the HPF 12 (FIG. 2).

Figure 4:
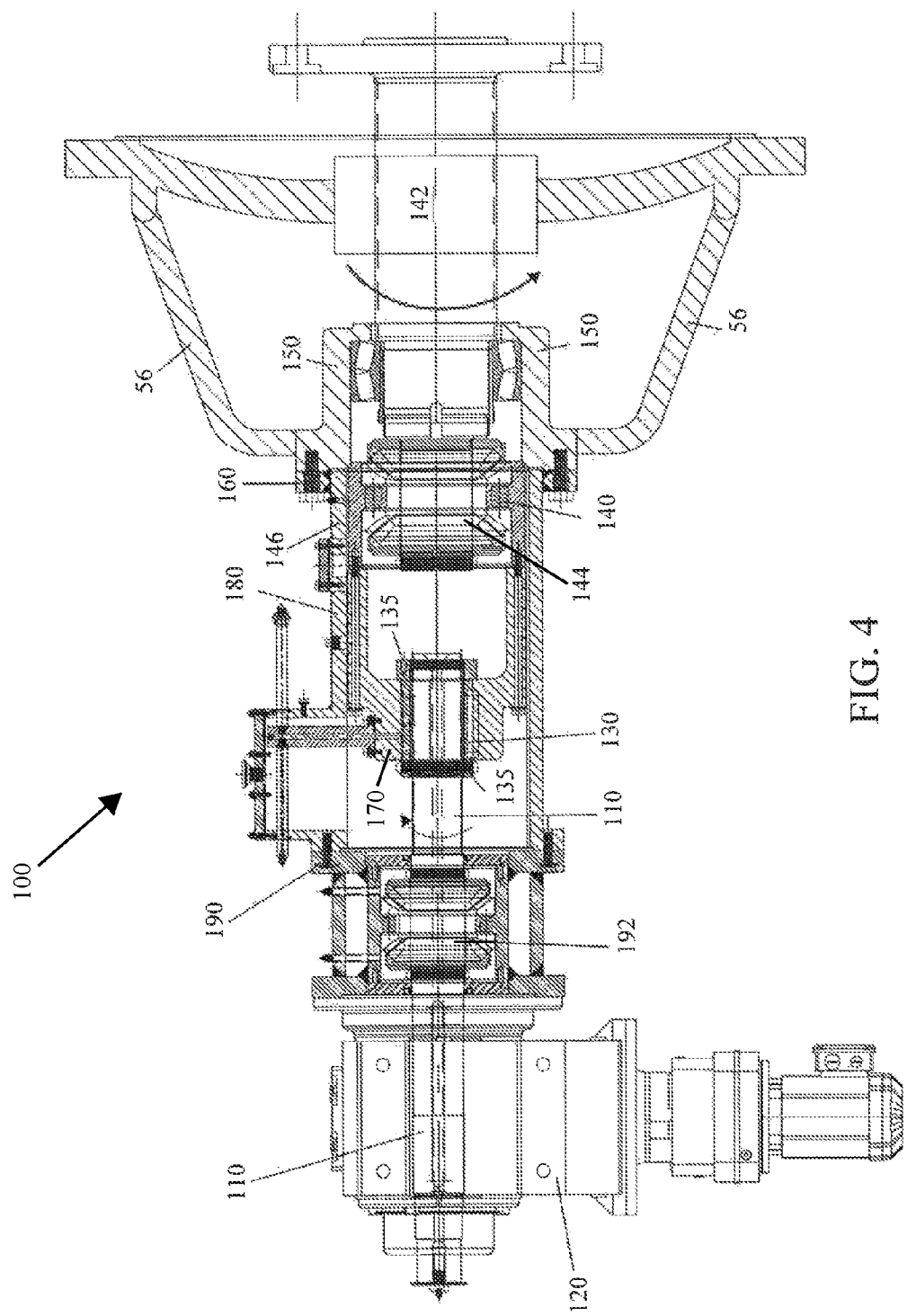
FIG. 4 is side view of a mounting and support mechanism for an exemplary rotary feeder gear motor, adjusting shaft and bearing carrier mechanism according to the present disclosure.

FIG. 4 shows a mounting and support mechanism 100 for a rotary feeder gear motor 120, hollow adjusting housing 180 and a stationary feeder end cover 150 fixed to one of the end bell chambers 56 (of FIG. 2). The hollow adjusting housing 180 encloses a portion of an adjusting shaft 110 extending from the rotary feeder gear motor 120, a carrier extension 170, a stationary bushing 130, and a bearing carrier mechanism 140 that supports an end of a shaft 142 fixed to the pocketed cylindrical rotor 35.

The bearing carrier mechanism 140 allows the shaft 142 to rotate while the hollow adjusting housing 180 and carrier extension 170 do not rotate. The bearing carrier mechanism 140 may include a pair of opposing thrust bearings 144 that support the shaft 142 in a cylindrical cage 146 of the bearing carrier mechanism 140. An end of the bearing carrier mechanism 140 attaches to the carrier extension 170.

The carrier extension 170 may be a generally cylindrical piece including a center opening that supports the stationary bushing 130. The brushing 130 may be a generally cylindrical piece (brass or other suitable material) having annular flanges 135 at opposite ends of the stationary bushing 130. The annular flanges 135 at opposite ends of stationary bushing 130 allow seating of the adjusting shaft 110 within the carrier extension 170.

The bearing carrier mechanism 140 slides axially within the hollow adjusting housing 180 which may include a cylindrical inner bearing surface that supports and abuts an outer cylindrical surface of the bearing carrier mechanism 140. To adjust the axial position of the pocketed cylindrical rotor 35, the rotary feeder gear motor 120 turns the adjusting shaft 110 which rotates via threads within an assembly including the brushing 130, carrier extension 170, bearing carrier mechanism 140 and shaft 142.

The hollow adjusting housing 180 includes a support flange 190 located adjacent the rotary feeder gear motor 120 (such as a circular mounting plate with an opening for the adjusting shaft 110), a hollow adjusting housing 180 and stationary feeder support flange 160. The support flange 190 is at an opposite end of the hollow adjusting housing 180 to the stationary feeder support flange 160. The stationary feeder support flange 160 is fixed to the stationary feeder end cover 150 on the end bell chamber 56.

The stationary feeder support flange 160, support flange 190, and hollow adjusting housing 180 may be welded, bolted or otherwise fasten together. The hollow adjusting housing 180 may be round, elliptical, rectangular or other shape in cross section. The hollow adjusting housing 180 may be coaxial with the pocketed cylindrical rotor 35. Support flange 190 may be attached to the rotary feeder gear motor 120 by bolts (not shown). A thrust bearing 192 may be adjacent support flange 190 inside the hollow adjusting housing 180. If the thrust bearing 192 is present, it protects the rotary feeder gear motor 120 should an upset condition occur where the shaft 142 is forced though the hollow adjusting housing 180 toward support flange 190. Stationary feeder support flange 160 may be attached to the stationary feeder end cover 150 by bolts (not shown). The mounting and support mechanism 100 allows for a support mechanism not requiring a torsion bar or a mounting surface or a bar as are shown in U.S. Pat. No. 7,350,674.

Inside the hollow adjusting housing 180 is the carrier extension 170. Carrier extension 170 encases the stationary bushing 130 and at one end connects to the bearing carrier mechanism 140. The stationary bushing 130 is threaded and allows the threaded section of the adjusting shaft 110 to move the rotor assembly axially inside the hollow adjusting housing 180 for proper operation.

The stationary bushing 130 does not rotate but moves axially with the carrier extension 170. The carrier extension 170 is sized such that the adjusting shaft 110 is allowed to thread through (and rotate) and between stationary bushing 130 and bearing carrier mechanism 140. Carrier extension 170 allows shaft 142 to move axially in the HPF housing.

An exemplary embodiment of a mounting and support mechanism for the rotary feeder adjusting mechanism having a rotary feeder gear motor, adjusting shaft, stationary bushing, and bearing carrier mechanism has been developed to provide the necessary torsional and axial support. The mounting and support mechanism includes an adjusting housing assembly made up of a support flange attached to the rotary feeder gear motor end. Within the adjusting housing assembly the adjusting shaft can move toward a bearing carrier mechanism. The bearing carrier mechanism allows a rotor axially inside a stationary bushing where the adjusting shaft can move toward a bearing carrier mechanism, a stationary feeder support flange adjacent a rotary feeder stationary feeder end cover, and a hollow adjusting housing extending between the support flange and the stationary feeder support flange. The stationary feeder support flange and the support flange may each have bolts to secure the flanges to the rotary feeder stationary feeder end cover and the rotary feeder gear motor. Alternatively, either flange may have bolts to secure the flange to the rotary feeder stationary feeder end cover and the rotary feeder gear motor. Any suitable means of securing the flanges to the rotary feeder stationary feeder end cover and the rotary feeder gear motor may be used.

The adjusting housing assembly including the support flange, the stationary feeder support flange and the hollow housing between the flanges may be made of any number of suitable construction materials such as carbon or stainless steel or alternate metals, alloys or composites or other suitable material. The hollow adjusting housing of the adjusting housing assembly may be cylindrical or of a similar shape so as to encase/encircle the adjusting shaft from the support flange at the gear motor end to the stationary feeder support flange adjacent the rotary feeder stationary feeder end cover.

An exemplary embodiment of an adjustment mechanism for a rotary feeder includes a hollow adjusting housing, a gear motor, external to the hollow adjusting housing, mounted to a first end of the hollow adjusting housing, a rotating adjusting shaft enclosed by the hollow adjusting housing, and a rotor coupling between the adjusting shaft and a first end of the cylindrical pocketed rotor of the rotary feeder. The hollow adjusting housing may include a cylindrical sidewall having at one end a connection to the stationary feeder end cover and therefore the end bell chamber of the rotary feeder and a support flange at an opposite end of the sidewall. The support flange supports a gear motor that rotates the adjusting shaft.

A threaded end of the adjusting shaft engages a threaded, stationary bushing in the carrier extension. The rotation of the adjusting shaft in the stationary bushing forces the rotor coupling to move the rotor in an axial direction. The carrier extension at one end encases a threaded, stationary bushing. This rotating adjusting shaft engages the stationary bushing and causes the carrier extension and the rotor assembly to which the carrier extension is attached to move axially. Additionally, the carrier extension is sized such that the adjusting shaft is allowed to thread through and between the stationary bushing and a bearing carrier mechanism.

The carrier extension may be attached at one end to a threaded, stationary bushing and at the opposite end an interior wall of the hollow adjusting housing. The carrier extension may be made of any number of suitable construction materials such as carbon or stainless steel or alternate metals, alloys or composites or other suitable material to withstand the environment within the hollow adjusting housing. The purpose of the carrier extension can be to provide support for the adjusting shaft and the bearing carrier mechanism.

An exemplary embodiment of a mounting and support mechanism for a rotary feeder gear motor has been developed comprising: an adjusting housing assembly wherein the adjusting housing assembly is comprised of a support flange adjacent the rotary feeder gear motor, a hollow adjusting housing and a stationary feeder support flange adjacent a rotary feeder stationary feeder end cover. The hollow adjusting housing has internal components, including an adjusting shaft, a bearing carrier mechanism, a carrier extension and a threaded, stationary bushing. The adjusting housing assembly is typically cylindrical or other similar shape and encases the bearing carrier mechanism.

The bearing carrier mechanism follows a rotor axially inside the hollow adjusting housing. The hollow adjusting housing extends between the support flange and the support stationary feeder flange. The support flange and the stationary feeder support flange may each have bolts to secure the flanges to the rotary feeder stationary feeder end cover and the rotary feeder gear motor, respectively. The adjusting housing assembly including the support flange, the stationary feeder support flange and the hollow adjusting housing may be made of any number of suitable material of construction such as carbon or stainless steel or alternate metals, alloys, or composite material or other suitable material. A suitable material is one capable of withstanding the environment within the hollow adjusting housing.

An exemplary hollow adjusting housing for a rotary feeder has been developed comprising: a carrier extension wherein the carrier extension at one end encases a threaded, stationary bushing, and an adjusting shaft wherein the adjusting shaft rotates and engages the stationary bushing thereby moving axially the carrier extension and the adjusting shaft to which the carrier extension is attached. The carrier extension is sized such that the adjusting shaft is allowed to thread through and between the stationary bushing and a bearing carrier mechanism. The carrier extension may be made of any number of suitable material of construction such as carbon or stainless steel or alternate metals, alloys, or composite materials, or other suitable material. A suitable material is one capable of withstanding the environment within the hollow adjusting housing.

While the invention has been described in connection with what is presently considered to be the most practical and exemplary embodiment, it is to be understood that the invention is not to be limited to the disclosed embodiments, but on the contrary, is intended to cover various modifications and equivalent arrangements included within the spirit and scope of the appended claims.

What is claimed is:

1. An adjustment assembly for axially adjusting a rotor in a rotary feeder comprising:
   a housing having a first end distally disposed from a second end;
   a carrier extension disposed within the housing, the carrier extension having a bearing end distally disposed from an adjustment shaft end, wherein the carrier extension is configured to slide axially within the housing, and wherein the adjustment end has areas defining a center opening;
   a bearing carrier disposed within the housing adjacent to the bearing end of the carrier extension, wherein the bearing carrier is disposed at the first end of the housing, wherein the bearing carrier is configured to slide axially within the housing, and wherein the bearing carrier supports a first thrust bearing configured to engage a shaft connected to a rotor disposed in a rotary feeder;

a stationary bushing disposed in the center opening of the adjustment shaft end, wherein an inner wall of the stationary bearing is threaded;

a second thrust bearing disposed within the housing at the second end;

an adjusting shaft having a threaded end, a motor end distally disposed from the threaded end, and a body extending between the threaded end and the motor end, wherein the threaded end is disposed within the stationary bearing, wherein the motor end is configured to engage a motor, and wherein the body extends through the second thrust bearing.

2. The adjustment assembly of claim 1 further comprising the motor engaged to the second end of the housing, wherein the motor is configured to rotate the adjusting shaft.

3. The adjustment assembly of claim 2, wherein the thread end of the adjustment shaft is threadedly engaged to the inner wall of the stationary bearing, and wherein the threads transform a rotational movement of the adjustment shaft into an axial movement of the carrier extension.

4. The adjustment assembly of claim 3, wherein the carrier extension is engaged to the bearing carrier and wherein the bearing carrier transfers the axial movement of the carrier extension to the first thrust bearing.

5. The adjustment assembly of claim 4 further comprising the shaft connected to a rotor disposed in a rotary feeder, wherein the shaft has a shaft end disposed through the first thrust bearing such that that shaft is configured to rotate freely within the first thrust bearing, and wherein the first thrust beading transfers the axial movement from the bearing carrier into the shaft, thereby configuring the adjustment assembly to axially adjust the rotor in the rotary feeder.

6. The adjustment assembly of claim 1, wherein the first end of the housing engages a stationary support flange of a side of the rotary feeder.

7. The adjustment assembly of claim 1, wherein the second end of housing further comprises a thrust bearing housing, and a motor engaged to the second end of the housing.

8. The adjustment assembly of claim 1, wherein the carrier extension comprises a material selected from the group consisting of: carbon, stainless steel, or a composite material.

9. The adjustment assembly of claim 1, wherein the stationary bushing further comprises annular flanges disposed at opposite ends of the stationary bushing, wherein the annular flanges seat the adjusting shaft within the carrier extension.

10. The adjustment assembly of claim 1, wherein the housing is coaxial with the rotor.

11. An adjustment assembly for axially adjusting a rotor in a rotary feeder comprising:

a housing having a first end distally disposed from a second end;

a carrier extension disposed within the housing, the carrier extension having a bearing end distally disposed from an adjustment shaft end, wherein the carrier extension is configured to slide axially within the housing, and wherein the adjustment end has areas defining a center opening;

a bearing carrier disposed within the housing engaged to the bearing end of the carrier extension, wherein the bearing carrier is disposed at the first end of the housing, wherein the bearing carrier is configured to slide axially within the housing, wherein the bearing carrier has a thrust bearing support configured to engage a first thrust bearing, such that the thrust bearing slides axially with the bearing carrier and such that the thrust bearing is freely rotatable within the thrust bearing support;

a stationary bushing disposed in the center opening of the adjustment shaft end of the carrier extension, wherein an inner wall of the stationary bearing is threaded and wherein an outer wall of the stationary bearing is fixedly engaged to the carrier extension.

12. The assembly of claim 11 further comprising an adjusting shaft having a threaded end, a motor end distally disposed from the threaded end, and a body extending between the threaded end and the motor end, wherein the threaded end is disposed within the stationary bearing, wherein the motor end is configured to engage a motor.

13. The assembly of claim 12, further comprising a motor engaged to the second end of the housing, wherein the motor engages the motor end of the adjusting shaft.

14. The assembly of claim 13 further comprising a computer configured to activate the motor to adjust an axial position of a shaft connected to a rotor in a rotary feeder.

15. The assembly of claim 13, further comprising a second thrust bearing disposed within the housing at the second end, wherein the body of the adjusting shaft extends through the second thrust bearing.

16. The adjustment assembly of claim 15, wherein the second end of housing further comprises a thrust bearing housing, and wherein the second thrust bearing is disposed within the thrust bearing housing.

17. The assembly of claim 11, wherein the housing is cylindrical and wherein the housing assembly encloses the carrier extension, bearing carrier, and first thrust bearing.

18. The assembly of claim 17, wherein the carrier extension and bearing carrier and cylindrical.

19. The adjustment assembly of claim 11, wherein the carrier extension comprises a material selected from the group consisting of: carbon, stainless steel, or a composite material.

20. The adjustment assembly of claim 11, wherein the stationary bushing further comprises annular flanges disposed at opposite ends of the stationary bushing, wherein the annular flanges seat the adjusting shaft within the carrier extension.

* * * * *